(12) United States Patent
Park

(10) Patent No.: US 8,409,466 B2
(45) Date of Patent: Apr. 2, 2013

(54) COMPOSITION COMPRISING IONIZED GERMANUIM DIOXIDE, METHOD OF MAKING AND USE THEREOF

(75) Inventor: Chang Seo Park, Goyang-si (KR)

(73) Assignees: Hyung Jun Kim, Seoul (KR); Hyung Jin Kim, Lake Forest, CA (US); Chang Seo Park, Goyang-si, Gyeonggi-do (KR); Bizbank, Inc., Seoul (KR); Three Castle, Inc., Lake Forest, CA (US)

( * ) Notice: Subject to any disclaimer, the term of this patent is extended or adjusted under 35 U.S.C. 154(b) by 29 days.

(21) Appl. No.: 12/880,873

(22) Filed: Sep. 13, 2010

(65) Prior Publication Data

US 2012/0060784 A1    Mar. 15, 2012

(51) Int. Cl.
*C09K 5/00* (2006.01)

(52) U.S. Cl. .......... 252/71; 252/73; 252/74; 252/75; 252/76

(58) Field of Classification Search .............. None
See application file for complete search history.

(56) References Cited

U.S. PATENT DOCUMENTS 5,571,460 A * 11/1996 Choi et al. ............ 252/587

* cited by examiner

*Primary Examiner* — Necholus Ogden, Jr.
(74) *Attorney, Agent, or Firm* — Lowe Hauptman Ham & Berner, LLP

(57) ABSTRACT

A composition comprising at least one ionized silicate mineral and water, wherein the at least one ionized silicate mineral is solvated in water, and wherein decomposition comprises an ionized germanium dioxide, its method of making, and its method of using are disclosed. While the composition is subject to a wide range of applications, it is especially suited for use in a coolant system for a combustion engine, and in particular, the coolant system for an internal combustion engine for vehicles.

27 Claims, No Drawings

COMPOSITION COMPRISING IONIZED GERMANUIM DIOXIDE, METHOD OF MAKING AND USE THEREOF

Described are a composition comprising an ionized silicate mineral and, in particular, an ionized germanium dioxide, solvated in water, methods and uses thereof. While the composition is subject to a wide range of applications, it is especially suited for use in a coolant system for a combustion engine, and in particular, the coolant system for an internal combustion engine for vehicles.

Relevant Technology

The fuel efficiency of a water-cooled internal combustion engine is closely related to the energy efficiency of fuel combustion and the air pollution caused by fuel combustion. As the cooling of internal combustion engines depletes over time, the efficiency of the cooling system is also adversely affected. Each inventor can envision a method which increases the fuel combustibility of engines and improves the fuel efficiency of the automobiles. One envisioned method to achieve these results is to use infrared and negative ion emission in the cooling system. Existing methods used for engine cooling systems use a variety of finely ground minerals, which are mixed with water and used in the automobile engines. These methods often use colloidal particles (ground to the size of 13. However, when the particles are in an ionized state in water, it is possible that the particle size increases as a result of precipitation or the attachment of water impurities to the particle. While circulating in a radiator coolant, these large particles facilitate the corrosion inside the radiator. Also, the large particles in the radiator cooling system stick inside the engine and cause problems.

DETAILED DESCRIPTION

Features and advantages of the embodiments disclosed herein will be set forth in the description which follows, and in part will be apparent from the description, or may be learned by practicing of the embodiments disclosed herein. Objects and advantages of the embodiments disclosed herein will be realized by the embodiments particularly pointed out in this description and the claims.

As broadly described, some embodiments are a composition comprising an ionized silicate mineral and, in particular, an ionized germanium dioxide, solvated in water, methods and uses thereof.

Some embodiments include a composition comprising at least one ionized silicate mineral and water, wherein the at least one ionized silicate mineral is solvated in water, and wherein the at least one ionized silicate mineral comprises germanium dioxide in an amount greater than or equal to 0.01% by weight of the ionized silicate mineral.

In some embodiments, the at least one ionized silicate mineral comprises germanium dioxide in an amount ranging from 0.017% to 0.05% by weight of the at least one ionized silicate mineral. In other embodiments, the amount ranges from 0.015 to 0.04% by weight of the at least one ionized silicate mineral. In other embodiments, the amount ranges from 0.01 to 0.03%.

In some embodiments, the at least one ionized silicate mineral comprises silicon dioxide in an amount equal to about 60% by weight of the at least one ionized silicate mineral. In other embodiments, the amount ranges from 40 to 80% by weight of the at least one ionized silicate mineral. In other embodiments, the amount ranges from 50 to 70%.

In some embodiments, the at least one ionized silicate mineral is readily made by the methods described herein starting from a commercially available at least one silicate mineral.

In some embodiments, the at least one silicate mineral is synthetic. In other embodiments, the at least one silicate mineral is naturally occurring. In some embodiments, the at least one silicate mineral is purified and/or otherwise treated for handling and/or stabilization purposes.

In some embodiments, the at least one silicate mineral is chosen from tectosilicates, phyllosilicates, inosilicates, cyclosilicates, sorosilicates, and nesosilicates.

In some embodiments, the Tectosilicates are chosen from those in the silica group, the feldspar group, the feldspathoid group, and the zeolite group. In some embodiments, the Tectosilicates are chosen from Albite, Andesine, Anorthite, Anorthoclase, Bytownite, Celsian, Chalcedony, Coesite, Cristobalite, Labradorite, Melanophlogite, Microcline, Oligoclase, Opal, Orthoclase, Plagioclase Feldspar, Potassium Feldspar, Quartz, Sanidine, and Tridymite.

In some embodiments, the Phyllosilicates are chose from those in the mica group, the serpentine group, and the talc group. In some embodiments, the phyllosilicates are chosen from Amesite (Serpentine), Antigorite (Serpentine), Chrysotile (Serpentine), Cronstedtite (Serpentine), Fraipontite (Serpentine), Garnierite (Serpentine), Lizardite (Serpentine), Nepouite (Serpentine), and Serpentine group.

In some embodiments the Inosilicates are chosen from those in the Amphibole Group and Pyroxene Group. In some embodiments, the indosilicates are chosen from Aegirine, Actinolite, Augite, Babingtonite, Bustamite, Diopside, Enstatite, Hedenbergite, Hypersthene, Jadeite, Johannsenite, Omphacite, Pectolite, Pyroxmangite, Rhodonite, Serandite, Spodumene, Tremolite, Wollastonite.

In some embodiments the Cyclosilicates are chosen from those in the tourmaline group. In some embodiments, the tourmaline members are chosen from Beryl, Dravite (Tourmaline), Elbaite (Tourmaline), Schorl (Tourmaline), Tourmaline Group.

In some embodiments, the Nesosilicates are chosen from those in the Olivine Group and the Garnet Group. In some embodiments, the Nesosilicates are chosen from Almandine (Garnet), Andradite (Garnet), Fayalite (Olivine), Forsterite (Olivine), Grossular (Garnet), Hafnon, Olivine, Pyrope (Garnet), Schorlomite (Garnet), Spessartine (Garnet), Tephroite, Thorite, Thorogummite, Topaz, Uvarovite (Garnet), and Zircon.

In most instances, the at least one silicate mineral is commercially available.

In some embodiments, the at least one silicate mineral is present in an amount ranging from 30 to 80% by weight of the composition. In some embodiments, the amount ranges from 35 to 75% by weight of the composition. In some embodiments, the amount ranges from 40 to 70% by weight of the composition.

In some embodiments, the composition has a pH ranging from 7 to 10. In some embodiments, the composition has a pH ranging from 8.5 to 9.5. In some embodiments, the composition has a pH ranging from 9 to 10.

In some embodiments, the composition further comprises at least one additive. In some embodiments, the at least one additive is chosen from compositions that emit infrared radiation, antifreeze additives, buffers, preservatives, antioxidants, thinners, barium salts and solvents.

In some embodiments, the at least one additive is chosen from compositions that emit infrared radiation. The compositions that emit infrared radiation, in some embodiments, are ionized. In some embodiments, the compositions that emit infrared radiation are ionized or unionized species of magnesium oxide, sodium alumiate, sodium thiosulfate, germanium dioxide, zinc oxide, potassium oxide, boron oxide, sodium silicate, aluminum oxide, silicon dioxide, sodium oxide, manganese oxide, copper oxide, iron oxide, oxidation zirconium, cobalt oxide, nickel oxide, chromium oxide, titanium oxide, molybdenum oxide, carbon system material, barium oxide, lithium oxide, an oxidizer iron (II), clay, loess and talc.

In some embodiments, the antifreeze additives are chosen from glycols, esters and salts thereof. For example, in some embodiments, the antifreeze additives are chosen from ethylene glycol, diethylene glycol, propylene glycol, 2-ethylhexanoate, and salts thereof.

In some embodiments, the antifreeze additives are chosen from hydroxides. In some embodiments, the hydroxides are chosen from alkali hydroxides and alkaline hydroxides.

In some embodiments, the preservative used is Benzoic Acid.

In some embodiments, the barium salts are chosen from barium bromide, barium carbonate, barium chloride, barium chromate, barium fluoride, barium cyclohexanebutyrate, barium hexafluorosilicate, barium hydroxide, barium iodide, barium manganate, barium metaborate, barium metaphosphate, barium molybdate, barium nitrate, barium perchlorate, barium phosphate, and barium selenate.

Some embodiments include a composition comprising at least one ionized silicate mineral, ionized germanium dioxide, and water, wherein the at least one ionized silicate mineral is solvated in water, wherein the at least one ionized silicate mineral optionally comprises germanium dioxide, wherein the ionized germanium dioxide is solvated in water, and wherein the amount of ionized germanium dioxide plus the amount of germanium dioxide in the at least one ionized silicate mineral is greater than or equal to 0.01% by weight of the ionized silicate mineral.

In some embodiments, the at least one ionized silicate mineral comprises germanium dioxide. In some embodiments, the at least one ionized silicate mineral comprises germanium dioxide in an amount ranging from 0.017 to 1.50% by weight of the at least one ionized silicate mineral. In some embodiments, the amount ranges from 0.015 to 1.25%. In some embodiments, the amount ranges from 0.01 to 1%.

In some embodiments, the at least one ionized silicate mineral comprises silicon dioxide in an amount ranging less than or equal to 10% by weight of the at least one ionized silicate mineral. In other embodiments, the amount ranges from 5 to 11% by weight of the at least one ionized silicate mineral. In other embodiments, the amount ranges from 6 to 10%.

In some embodiments, the at least one ionized silicate mineral is readily made by the methods described herein starting from a commercially available at least one silicate mineral.

In some embodiments, the at least one silicate mineral is synthetic. In other embodiments, the at least one silicate mineral is naturally occurring. In some embodiments, the at least one silicate mineral is purified and/or otherwise treated for handling and/or stabilization purposes.

In some embodiments, the at least one silicate mineral is chosen from Tectosilicates, Phyllosilicates, Inosilicates, Cyclosilicates, Sorosilicates, and Nesosilicates. The at least one silicate mineral is chosen from those already mentioned hereinabove.

In some embodiments, the at least one ionized silicate mineral is derived from at least one silicate mineral comprising germanium dioxide in an amount ranging from 0.01 to 1% by weight of the at least one ionized silicate mineral. In some embodiments, the amount ranges from 0.01 to 0.03%.

In some embodiments, the at least one ionized silicate mineral is present in an amount ranging from 14 to 24% by weight of the composition. In some embodiments, the amount ranges from 16 to 22% by weight of the composition. In some embodiments, the amount ranges from 18 to 20%.

In some embodiments, the at least one ionized germanium dioxide is readily made by the methods described herein starting from germanium dioxide or a precursor thereof. In most instances, the germanium dioxide or a precursor thereof is commercially available.

In some embodiments, the ionized germanium dioxide is present in an amount ranging from 0.017 to 1.5% by weight of the at least one ionized silicate mineral. In some embodiments, the amount ranges from 0.015 to 1.25% by weight of the at least one ionized silicate mineral. In some embodiments, the amount ranges from 0.01 to 1%.

In some embodiments, the composition has a pH ranging from 7 to 10. In some embodiments, the composition has a pH ranging from 8.5 to 9.5. In some embodiments, the composition has a pH ranging from 9 to 10.

In some embodiments, the composition further comprises at least one additive. The at least one additive is chosen from those already mentioned hereinabove.

An embodiment of the composition is made in various manners. In some embodiments, a method of making a composition, comprises pulverizing at least one silicate mineral to form at least one ground silicate mineral;

heating the at least one ground silicate mineral at a temperature sufficient to fuse the at least one ground silicate mineral;

adding at least one alkali salt to the at least one fused silicate mineral to form a mixture;

applying pressure to liquefy the mixture; and adding water to the liquefied mixture.

In some embodiments, the pulverizing produces at least one ground silicate mineral having a size greater than 10,000 nm. In some embodiments, the size ranges from 8,000 to 15,000 nm.

In some embodiments, in the heating, the temperature sufficient to fuse ranges above 1000 degrees Celsius. In some embodiments, the temperature ranges from about 1100 to 1600 degrees Celsius. In some embodiments, the temperature ranges from 1300 to 1500 degrees Celsius.

In some embodiments, in the applying, the pressure to liquefy ranges from 1.0 to 5.0 atmospheres. In some embodiments, the pressure ranges from 2 to. 3 atm.

In some embodiments, in the adding, the at least one alkali salt is chosen from Sodium Hydroxide, Potassium Hydroxide, Sodium Carbonate, and Potassium Carbonate. These materials are commercially available.

In some embodiments, a method of making a composition comprises pulverizing at least one silicate mineral to form at least one ground silicate mineral;

heating at least one ground silicate mineral at a temperature sufficient to fuse the at least one ground silicate mineral;

adding ionized germanium dioxide or a precursor thereof (e.g., germanium dioxide) to the at least one fused silicate mineral;

adding at least one alkali salt to the at least one fused silicate mineral to form a mixture;

applying pressure to liquefy the mixture; and adding water to the liquefied mixture; and wherein the composition comprises at least one ionized silicate mineral, ionized germanium dioxide, and water; wherein the at least one ionized silicate mineral and ionized germanium dioxide are solvated in water; wherein the at least one ionized silicate mineral optionally comprises germanium dioxide; and wherein the amount of ionized germanium dioxide plus the amount of germanium dioxide in the at least one ionized silicate mineral is less than or equal to 1% by weight of the ionized silicate mineral.

In some embodiments, the at least one additives are added to the underlying composition in the standard manner. For example, in some embodiments, the underlying composition and the at least one additive are mixed, e.g., at a temperature of 10-20 degrees Celsius.

An embodiment of the composition is used in various manners. In some embodiments, the composition is added to the radiator coolant that is circulated through the engine and radiator, within the cooling system of the vehicle.

In some embodiments, the composition is used in a method of operating a combustion engine, comprising:
adding, to a radiator coolant in the combustion engine, the composition.

In some embodiments, the composition is added in an amount of at least 100 mL per 2,500 cc of cylinder capacity.

In some embodiments, the composition is added in an amount of at least 3.37 oz per 2.5 L of an engine size.

In some embodiments, the composition is added in an amount of at least 100 mL per 6-10 L of cooling capacity of the engine.

In some embodiments, the composition is added in an amount of at least 3.37 oz per 1.5 to 2.63 gallons of coolant amount.

In some embodiments, the composition is emits infrared radiation.

In some embodiments, the composition forms an anticorrosion coating outside a cylinder wall of the combustion engine and an inner wall of the radiator.

Each embodiment of the composition, when used in a radiator cooling system of a water-cooled internal combustion engine, makes it possible to achieve one or more of the following effects without contributing to the wear and tear of the cooling system.

(1) The negative ions emitted from some embodiments of the composition neutralize positive ions produced by the combusting fuel. As a result, the positive ions that block heat exchange from the cylinder of the engine are removed and the coolant composition is able to quickly absorb the heat from the engine cylinder and subsequently increase the effect of the heat exchange.

(2) The infrared radiation and negative ions emitted by some embodiments of the composition vibrate fuel molecules inside the cylinder, which vibrations break down the fuel molecules into smaller molecules and hence, enhance the fuel combustion to improve fuel economy and reduce waste emissions.

(3) Some embodiments of the composition form a coating outside the cylinder wall and the inner radiator wall by metal ion binding, and the coating makes it possible to retard corrosion of one wall or both of the walls.

(4) Some embodiments of the composition generate wave energy resulting in rotation and vibration of the surrounding molecules to the order of 20,000 to 400,000 times a second. This wave energy decomposes the water molecules that purified the coolant composition, thereby improving the cooling efficiency and extending the life of the coolant composition. The wave energy also causes vibration and rotation of the coolant water molecules, which absorbs noise and vibration from the internal combustion engine.

(5) The infrared radiation and negative ions emitted by some embodiments of the composition also degrade odor and combustion emission molecules, which helps in removing odor of combustion emission.

(6) In addition, some embodiments of the composition help stabilize a coolant temperature by absorbing the heat from high temperature in the internal combustion engine.

(7) The infrared radiation and negative ions emitted by some embodiments of the composition penetrate the body of the automobile occupant, improving the blood circulation and reducing passenger fatigue.

Example 1

An Exemplary Embodiment of the Composition

Table 1 below shows the starting material that was used to make the embodiment of the composition shown in table 2.

TABLE 1

Starting Material

| Ingredient | General Description | Specific description | Quantity (Weight) |
| --- | --- | --- | --- |
| A | At least one silicate mineral | 60% Silicon Dioxide | 70-80% |
| B | Water | Tap water | Under 10% |
| C | Sodium Salt | Of 99% purity | Under 10% |
| D | Antifreeze | Ethylene Glycol | Under 1% |
| E | Germanium Dioxide | Powder of 99.99% purity | Under 1% |
| F | Silicon dioxide | Powder of 99.5% purity | Under 1% |

TABLE 2

Product Ingredients of Composition 1

| Ingredient | General Description | Specific description | Quantity (Weight) |
| --- | --- | --- | --- |
| 1 | At least one ionized silicate mineral | 6-10% Silicon ions | 6-10% |
| 2 | Water | Tap water | 71-80% |
| 3 | Sodium Salt | Of 99% purity | 4-10% |
| 4 | Ionized Silicon dioxide | Ion | 6-10% |
| 5 | Ionized germanium dioxide | Ion | Under 1% |
| 6 | Antifreeze | Ethylene Glycol | Under 1% |

The starting material in Table 1 was processed by the method described above to produce the product in Table 2. This product is herein referred to as Composition 1.

Example 2

Use of Composition 1 as a Radiator Coolant

Composition 1 is added to a radiator coolant of an internal combustion engine of an automobile.

Example 3

Composition 1 in Use

Composition 1, in an amount of 300 ml, is added to a radiator coolant of an internal combustion engine of a 1996, GMC C1500 Sierra, 5.7 L engine size, with a gasoline engine.

Example 4

Composition 1 Reduces Emissions

Composition 1, in an amount of 300 nil, was added to a radiator coolant of an internal combustion engine of a 1996, GMC C1500 SIERRA, automatic, 8 cylinder, 5.7 L engine size having 195,159 miles. Using the California emissions standard test ASM Emission Test Results in effect during May 2010, the following data in Table 3 were generated.

TABLE 3

| ASM Emission Test Results | | | | | | |
|---|---|---|---|---|---|---|
| Test | RPM | $CO_2$ % | $O_2$ % | HC (ppm) | CO % | NO (ppm) |
| 15 mph | 2069 | 14.80 | 0.11 | 18 | 0.08 | 63 |
| 25 mph | 1790 | 14.82 | 0.09 | 11 | 0.05 | 49 |

HC means hydrocarbon.

The results indicate that this vehicle passed the CA emissions test.

Example 5

Composition 1 Saves Gas

Composition 1, in an amount of 100-300 ml, was added to a radiator coolant of an internal combustion engine of each automobile identified in Table 4 below.

TABLE 4

| Actual Consumer Gas Savings | | | | | | |
|---|---|---|---|---|---|---|
| MFG | Model | Year | Fuel capacity (gal) | Driving Distance before adding Composition 1 (in Miles) | Driving Distance after adding Composition 1 (in Miles) | Savings (% increase in Driving Distance) |
| Honda | Pilot | 2003 | 19.2 | 290 | 340 | 17% |
| Honda | Pilot | 2003 | 19.2 | 280 | 330 | 15% |
| Acura | TL | 2001 | 17.2 | 350 | 400 | 12.50% |
| Acura | MDX | 2006 | 20.4 | 280 | 330 | 18% |
| Honda | Civic | 2008 | 13.2 | 340 | 390 | 14.70% |
| Chevy | Astro van | 1996 | 25 | 210 | 250 | 19% |
| GMC | Sierra 1500 | 1996 | 40 | 560 | 680 | 21% |
| Toyota | Tacoma | 2006 | 21.1 | 340 | 390 | 15% |
| Honda | Pilot | 2007 | 19.2 | 290 | 340 | 17% |

The percentage increase in Driving Distance in the Savings column was calculated by the following formula:

[(After Comp. 1 minus Before Comp. 1)/Before Comp. 1]×100%, e.g., [(340−290)/290]× 100%=17%.

The results indicate that vehicle generated savings as the vehicle drove for more distance after adding Composition 1.

Other embodiments will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A composition for use in a coolant system comprising:
   at least one ionized silicate mineral; and
   water;
   wherein the at least one ionized silicate mineral is solvated in water; and
   wherein the at least one ionized silicate mineral comprises germanium dioxide in an amount greater than or equal to 0.01% by weight of the ionized silicate mineral.

2. The composition of claim 1, wherein the at least one ionized silicate mineral comprises germanium dioxide in an amount ranging from 0.01% to 0.03% by weight of the at least one ionized silicate mineral.

3. The composition of claim 1, wherein the at least one ionized silicate mineral comprises silicon dioxide in an amount equal to about 60% by weight of the at least one ionized silicate mineral.

4. The composition of claim 1, wherein the at least one silicate mineral is present in an amount ranging from 40 to 70% by weight of the composition.

5. The composition of claim 1 wherein the composition further comprises at least one additive.

6. The composition of claim 1, wherein the composition has a pH ranging from 8 to 10.

7. A composition for use in a coolant system comprising:
   at least one ionized silicate mineral;
   ionized germanium dioxide; and
   water;
   wherein the at least one ionized silicate mineral is solvated in water;
   wherein the ionized germanium dioxide is solvated in water;
   wherein the at least one ionized silicate mineral optionally comprises germanium dioxide; and
   wherein the amount of ionized germanium dioxide plus the amount of germanium dioxide in the at least one ionized silicate mineral is greater than or equal to 0.01% by weight of the ionized silicate mineral.

8. The composition of claim 7, wherein the at least one silicate mineral comprises germanium dioxide.

9. The composition of claim 7, wherein the at least one silicate mineral comprises germanium dioxide in an amount ranging from 0.01 to 1% by weight of the at least one ionized silicate mineral.

10. The composition of claim 7, wherein the at least one ionized silicate mineral comprises silicon dioxide in an amount ranging from 6-10% by weight of the at least one ionized silicate mineral.

11. The composition of claim 7, wherein the at least one ionized silicate mineral is present in an amount ranging from 18 to 20% by weight of the composition.

12. The composition of claim 7, wherein the ionized germanium dioxide is present in an amount ranging from 0.01 to 1% by weight of the at least one ionized silicate mineral.

13. The composition of claim 7, wherein the composition further comprises at least one additive.

14. The composition of claim 7, wherein the composition has a pH ranging from 8 to 10.

15. A method of making a composition for use in a coolant system, comprising:
  heating at least one ground silicate mineral at a temperature sufficient to fuse the at least one ground silicate mineral;
  adding at least one alkali salt to the at least one fused silicate mineral to form a mixture;
  applying pressure to liquefy the mixture; and
  adding water to the liquefied mixture; and
  wherein the composition comprises:
  at least one ionized silicate mineral; and
  water;
  wherein the at least one ionized silicate mineral is solvated in water; and
  wherein the at least one ionized silicate mineral comprises germanium dioxide in an amount greater than or equal to 0.01% by weight of the ionized silicate mineral.

16. The method of claim 15, wherein the at least one ground silicate mineral comprises of a size greater than or equal to 10,000 nm.

17. The method of claim 15, wherein, in the heating, the temperature sufficient to fuse ranges from about 1300 to 1500 degrees Celsius.

18. The method of claim 15, wherein, in the applying, the pressure to liquefy ranges from 2 to 3 atmospheres.

19. The method of claim 15, wherein, in the adding, the at least one alkali salt is chosen from sodium hydroxide, potassium hydroxide, sodium carbonate, and potassium carbonate.

20. A method of making a composition for use in a coolant system, comprising:
  heating at least one ground silicate mineral at a temperature sufficient to fuse the at least one ground silicate mineral;
  adding ionized germanium dioxide to the at least one fused silicate mineral;
  adding at least one alkali salt to the at least one fused silicate mineral to form a mixture;
  applying pressure to liquefy the mixture; and
  adding water to the liquefied mixture; and
  wherein the composition comprises:
  at least one ionized silicate mineral;
  ionized germanium dioxide; and
  water;
  wherein the at least one ionized silicate mineral is solvated in water;
  wherein the ionized germanium dioxide is solvated in water;
  wherein the at least one ionized silicate mineral optionally comprises germanium dioxide; and
  wherein the amount of ionized germanium dioxide plus the amount of germanium dioxide in the at least one ionized silicate mineral is greater than or equal to 0.01% by weight of the ionized silicate mineral.

21. The method of claim 20, wherein the at least one ground silicate mineral comprises of a size greater than or equal to 10,000 nm.

22. The method of claim 20, wherein, in the heating, the temperature sufficient to fuse ranges from about 1300 to 1500 degrees Celsius.

23. The method of claim 20, wherein, in the applying, the pressure to liquefy ranges from 2 to 3 atmospheres.

24. The method of claim 20, wherein, in the adding, the at least one alkali salt is chosen from sodium hydroxide, potassium hydroxide, sodium carbonate, and potassium carbonate.

25. The method of claim 21, wherein the composition is present in an amount of at least 100 mL per 6-10 L of cooling capacity of the combustion engine.

26. The method of claim 21, wherein the composition emits infrared radiation.

27. The method of claim 21, wherein the composition forms an anti-corrosion coating outside a cylinder wall of the combustion engine and an inner wall of the radiator.

* * * * *

UNITED STATES PATENT AND TRADEMARK OFFICE
CERTIFICATE OF CORRECTION

PATENT NO. : 8,409,466 B2
APPLICATION NO. : 12/880873
DATED : April 2, 2013
INVENTOR(S) : Chang Seo Park It is certified that error appears in the above-identified patent and that said Letters Patent is hereby corrected as shown below:

Please replace the second full paragraph on column 1 of the Specification with the following amended paragraph:

Relevant Technology

The fuel efficiency of a water-cooled internal combustion engine is closely related to the energy efficiency of fuel combustion and the air pollution caused by fuel combustion. As the cooling of internal combustion engines depletes over time, the efficiency of the cooling system is also adversely affected. Each inventor can envision a method which increases the fuel combustibility of engines and improves the fuel efficiency of the automobiles. One envisioned method to achieve these results is to use infrared and negative ion emission in the cooling system. Existing methods used for engine cooling systems use a variety of finely ground minerals, which are mixed with water and used in the automobile engines. These methods often use colloidal particles (ground to the size of 13nm. However, when the particles are in an ionized state in water, it is possible that the particle size increases as a result of precipitation or the attachment of water impurities to the particle. While circulating in a radiator coolant, these large particles facilitate the corrosion inside the radiator. Also, the large particles in the radiator cooling system stick inside the engine and cause problems.

Signed and Sealed this
Twenty-fifth Day of June, 2013

Teresa Stanek Rea
*Acting Director of the United States Patent and Trademark Office*

CERTIFICATE OF CORRECTION (continued)
U.S. Pat. No. 8,409,466 B2

Please replace table 1 and table 2 on column 6 of the Specification with the following table 1 and table 2.

Table 1. Starting Material

| Ingredient | General Description | Specific description | Quantity (Weight) |
|---|---|---|---|
| A | At least one silicate mineral | 60% Silicon Dioxide | 70-80% |
| B | Water | Tap water | Under 20 % |
| C | Germanium Dioxide | Powder of 99.99% purity | Under 1% |
| D | Silicon dioxide | Powder of 99.5% purity | Under 1% |

Table 2. Product Ingredients of Composition 1

| Ingredient | General Description | Specific description | Quantity (Weight) |
|---|---|---|---|
| 1 | At least one ionized silicate mineral | 6-10% Silicon ions | 6-10% |
| 2 | Water | Tap water | 71-80% |
| 3 | Ionized Silicon dioxide | Ion | 6-10% |
| 4 | Ionized germanium dioxide | Ion | Under 1% |